(12) United States Patent
Chuang et al.

(10) Patent No.: US 8,229,590 B2
(45) Date of Patent: Jul. 24, 2012

(54) PROGRAMMING APPARATUS

(75) Inventors: Jui-Jen Chuang, Davis, CA (US);
Surya Kommareddy, Davis, CA (US);
Karthikeyan Rajamani, Davis, CA (US)

(73) Assignee: Mori Seiki Co., Ltd., Yamatokoriyama-shi, Nara (JP)

( * ) Notice: Subject to any disclaimer, the term of this patent is extended or adjusted under 35 U.S.C. 154(b) by 197 days.

(21) Appl. No.: 12/831,602

(22) Filed: Jul. 7, 2010

(65) Prior Publication Data

US 2011/0009993 A1   Jan. 13, 2011

Related U.S. Application Data

(60) Provisional application No. 61/224,346, filed on Jul. 9, 2009.

(51) Int. Cl.
*G06F 19/00* (2011.01)
*B23C 3/00* (2006.01)

(52) U.S. Cl. ................................ 700/182; 409/132

(58) Field of Classification Search .................. 700/182
See application file for complete search history.

(56) References Cited

U.S. PATENT DOCUMENTS 5,272,622 A * 12/1993 Mizukami .................... 700/86
5,453,933 A *  9/1995 Wright et al. ............... 700/181
6,223,095 B1 *  4/2001 Yamazaki et al. ........... 700/187
6,676,344 B1 *  1/2004 Amatt ........................ 409/132
7,487,006 B2 *  2/2009 Kamiya et al. ............. 700/183
2002/0193906 A1 * 12/2002 Sugiyama et al. .......... 700/188
2008/0086230 A1    4/2008 Maeda et al.

FOREIGN PATENT DOCUMENTS

JP    200887147     *  4/2008
JP    200887147 A     4/2008

* cited by examiner

*Primary Examiner* — Kakali Chaki
*Assistant Examiner* — Sivalingam Sivanesan
(74) *Attorney, Agent, or Firm* — Smith Patent Office

(57) ABSTRACT

A programming apparatus has a machining area recognizing section for recognizing a plurality of machining areas based on three-dimensional model data, a workpiece dividing section for setting a plurality of structures obtained by dividing a workpiece, a connection relationship recognizing section for recognizing a connection relationship between the machining areas, a machining area list generating section for recognizing, for each of the machining areas, either a machining type related to turning or a machining type related to milling corresponding thereto, and generating a machining area list in which the structures, machining areas, machining types and connection relationship are correlated with one another, a machining process setting section for setting, for each of the machining areas, a machining process corresponding to the machining type related to turning or milling thereof, and an NC program generating section for generating an NC program.

5 Claims, 8 Drawing Sheets

PROGRAMMING APPARATUS

CROSS REFERENCE TO RELATED APPLICATIONS

This application is a nonprovisional application of U.S. Provisional Patent Application No. 61/224,346 filed on Jul. 9, 2009. The disclosure of U.S. Provisional Patent Application No. 61/224,346 is hereby incorporated by reference.

TECHNICAL FIELD

The present invention relates to a programming apparatus for generating an NC program, used in a machine tool capable of performing a turning operation and a milling operation, for turning and milling a workpiece.

BACKGROUND ART

As a programming apparatus for generating an NC program for machining a workpiece, conventionally, an apparatus disclosed in the Japanese Unexamined Patent Application Publication No. 2008-87147 has been suggested, for example. This programming apparatus generates an NC program for performing, in a machine tool, on a workpiece, turning operations for outer-periphery cutting, inner-periphery cutting, hole machining etc. on the basis of three-dimensional model data of the workpiece.

SUMMARY OF THE INVENTION

Technical Problem

In machining in a machine tool, in addition to the above-mentioned turning operations, there are milling operations for surface machining, pocket machining, hole machining etc., and there is therefore a case where, in addition to turning operations, milling operations are also performed on a workpiece.

However, the above-described programming apparatus can generate only an NC program for turning. Therefore, it cannot generate an NC program with respect to a workpiece to be both turned and milled.

Further, in a case where a workpiece is both turned and milled, it is possible that an NC program for turning is generated by such a programming apparatus as described above to machine the machining areas to be turned and an NC program for milling is generated by another programming apparatus than the above-described one to machine the machining areas to be milled. However, this is inconvenient, and besides the operator may possibly make an error.

The present invention has been achieved in view of the above-described circumstances, and an object of the present invention is to provide a programming apparatus capable of easily and efficiently generating an NC program for turning and milling a workpiece.

Solution to Problem

The present invention, for achieving the above-described object, relates to a programming apparatus for generating an NC program for turning and milling a workpiece, comprising:

a model data storage section for storing three-dimensional model data representing the shape of the workpiece after machining;

a machining area recognizing section for recognizing, on the basis of the three-dimensional model data of the workpiece stored in the model data storage section, a plurality of machining areas which are areas to be machined;

a workpiece dividing section for setting, on the basis of the three-dimensional model data of the workpiece stored in the model data storage section and the machining areas recognized by the machining area recognizing section, a plurality of structures which each include one or more of the machining areas and which are obtained by dividing the workpiece in its axial direction;

a connection relationship recognizing section for recognizing a connection relationship between the machining areas on the basis of the three-dimensional model data of the workpiece stored in the model data storage section and the machining areas recognized by the machining area recognizing section;

a machining area list generating section for, on the basis of the machining areas recognized by the machining area recognizing section, the structures set by the workpiece dividing section, and the connection relationship recognized by the connection relationship recognizing section, recognizing, for each of the machining areas included in the structures, either a machining type related to turning or a machining type related to milling which corresponds thereto, and generating a machining area list in which the structures, the machining areas, the machining types and the connection relationship are correlated with one another;

a machining process setting section for setting, for each of the machining areas, a machining process which corresponds to the machining type related to turning or machining type related to milling thereof on the basis of the machining area list generated by the machining area list generating section;

an NC program generating section for generating an NC program on the basis of the machining processes set by the machining process setting section; and an NC program storage section for storing the NC program generated by the NC program generating section.

According to the present invention, initially the machining area recognizing section recognizes a plurality of machining areas, of a workpiece, which are areas to be machined on the basis of three-dimensional model data, stored in the model data storage section, representing the shape of the workpiece after being turned and milled. Thereafter, the workpiece dividing section sets a plurality of structures which each include one or more of the machining areas and which are obtained by dividing the workpiece in its axial direction on the basis of the three-dimensional model data of the workpiece stored in the model data storage section and the machining areas recognized by the machining area recognizing section. Further, the connection relationship recognizing section recognizes a connection relationship between the machining areas on the basis of the three-dimensional model data of the workpiece stored in the model data storage section and the machining areas recognized by the machining area recognizing section.

Subsequently, the machining area list generating section recognizes, for each of the machining areas included in the structures, either a machining type related to turning or a machining type related to milling which corresponds thereto on the basis of the machining areas recognized by the machining area recognizing section, the structures set by the workpiece dividing section and the connection relationship recognized by the connection relationship recognizing section, and then the machining area list generating section generates a machining area list in which the structures, the machining areas, the machining types and the connection relationship between the machining areas are correlated with one another.

The machining types include, for example, outer-periphery cutting, inner-periphery cutting, surface machining, pocket machining, hole machining etc. Among them, surface machining and pocket machining each belong to milling, and outer-periphery cutting, inner-periphery cutting and hole machining can each belong to turning or milling. The determination whether outer-periphery cutting, inner-periphery cutting and hole machining each belong to turning or milling is made by checking whether the axes of machining areas related thereto (the axes of an outer peripheral surface formed by the outer-periphery cutting, inner peripheral surface formed by the inner-periphery cutting and hole formed by the hole machining) each coincide with the axis of the workpiece. That is, they are each determined to belong to turning when their own axis coincides with the axis of the workpiece, and they are each determined to belong to milling when their own axis does not coincide with the axis of the workpiece.

Next, the machining process setting section sets, for each of the machining areas, a machining process corresponding to the machining type thereof on the basis of the machining area list generated by the machining area list generating section. Specifically, when a machining type is machining related to turning, a machining process corresponding to the machining related to turning is set, and when a machining type is machining related to milling, a machining process corresponding to the machining related to milling is set.

Thereafter, an NC program is generated by the NC program generating section on the basis of the set machining processes, and the generated NC program is stored in the NC program storage section.

Thus, according to the programming apparatus of the present invention, on the basis of three-dimensional model data of a workpiece to be turned and milled, a machining area list in which all machining areas of the workpiece are gathered is generated, and machining processes based on the generated machining area list are set and an NC program is generated on the basis thereof. Therefore, it is possible to, without bothering the operator, easily and efficiently generate an NC program for machining a workpiece to be both turned and milled.

The machining area list generated by the machining area list generating section may be configured as a data structure in which at least the relationship between the structures and the machining areas included therein and the relationship between the machining areas are represented by a tree structure where the structures have a sibling relationship and the structures and the machining areas included therein have such a parent-child relationship that each of the structures is a parent and the machining areas included therein are its children.

The machining process setting section may be configured to, in setting machining processes corresponding to the machining types related to milling of the machining areas, with respect to a machining area related to a plane forming the outer peripheral surface of one of structures, set a machining process in which the machining area is machined by milling after being machined by turning into a turning shape including the machining area to be machined by milling. Here, the turning shape means a shape which is obtained by rotating, about the axis of the workpiece, the most distant point, within the machining area to be milled, from the center of the workpiece in a plane vertical to the axis of the workpiece, and in which the workpiece is not machined into the shape to be obtained after milling.

Further, the programming apparatus may be configured to further comprise a coordinate system setting section for setting, for each of the machining areas, a coordinate system corresponding thereto on the basis of the machining areas recognized by the machining area recognizing section and the machining area list generated by the machining area list generating section. In this case, the machining process setting section is configured to set, for each of the machining areas, a machining process corresponding to the machining type related to turning or machining type related to milling thereof on the basis of the machining area list generated by the machining area list generating section and the coordinate systems set by the coordinate system setting section.

Furthermore, the programming apparatus may be configured to further comprise a machining order determining section for finally determining an execution order of the machining processes on the basis of the machining processes set by the machining process setting section. In this case, the NC program generating section is configured to generate an NC program on the basis of the machining processes set by the machining process setting section and the machining order finally determined by the machining order determining section.

Advantageous Effects of the Invention

As described above, according to the programming apparatus of the present invention, it is possible to easily and efficiently generate an NC program for turning and milling a workpiece.

DESCRIPTION OF THE EMBODIMENTS

Figure 2:
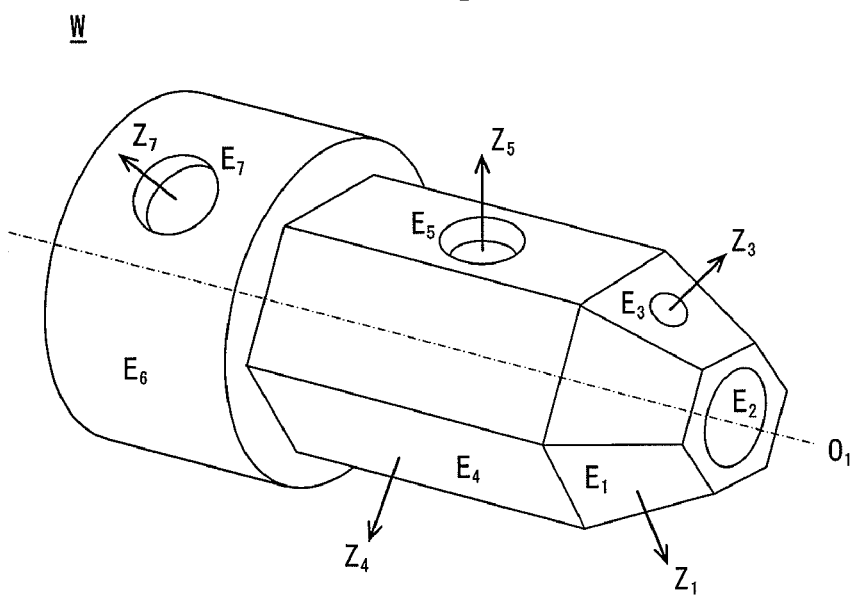
FIG. 2 is a perspective view showing the shape of a workpiece after machining (a product shape)

Hereinafter, a specific embodiment of the present invention will be described with reference to the accompanying drawings. In the embodiment, as an example, a case where an NC program for machining a workpiece into the shape as shown in FIG. 2 is generated will be described.

Figure 1:
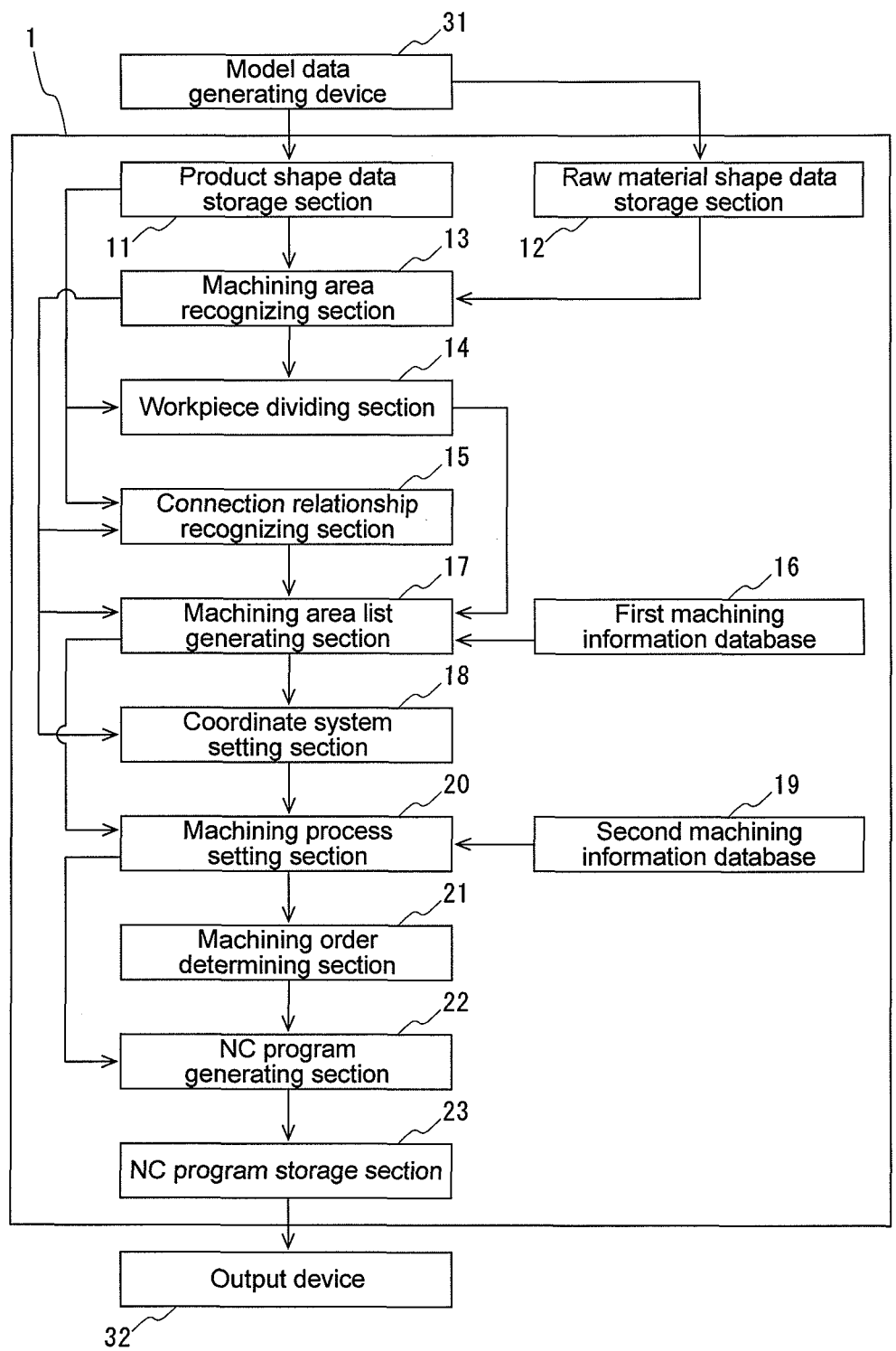
FIG. 1 is a block diagram showing a schematic configuration of a programming apparatus etc. according to one embodiment of the present invention.

As shown in FIG. 1, a programming apparatus 1 of the embodiment has a product shape data storage section 11, a raw material shape data storage section 12, a machining area recognizing section 13, a workpiece dividing section 14, a connection relationship recognizing section 15, a first machining information database 16, a machining area list generating section 17, a coordinate system setting section 18, a second machining information database 19, a machining process setting section 20, a machining order determining section 21, an NC program generating section 22 and an NC program storage section 23, and generates an NC program for performing turning and milling operations in, for example, an NC lathe of combined-machining type.

The NC lathe, although a detailed description thereof is omitted, has, as primary components, a first spindle provided horizontally and capable of holding one end of a workpiece, a second spindle provided coaxially with and facing the first spindle and capable of holding the other end of the workpiece, a first tool rest for holding rotary tools for performing milling operations such as outer-periphery cutting, inner-periphery cutting, surface machining, pocket machining and hole machining, and a second tool rest for holding non-rotary tools for performing turning operations such as outer-periphery cutting, inner-periphery cutting and hole machining, and machines the workpiece by relative movement of the workpiece held by the first spindle and/or second spindle and the tools held by the first tool rest and second tool rest.

In the product shape data storage section 11, three-dimensional model data representing a product shape generated by a model data generating device 31, i.e., three-dimensional model data representing a workpiece shape after machining is stored. In the embodiment, the shape of a workpiece W after machining is assumed to be the shape as shown in FIG. 2. Further, the three-dimensional model data is set so that the axis O1 of the workpiece W related to the three-dimensional model coincides with the axes of the spindles. The model data generating device 31 is not limited, and as a specific example thereof, for example, a CAD device capable of generating three-dimensional model data of a solid model is given.

Figure 3:
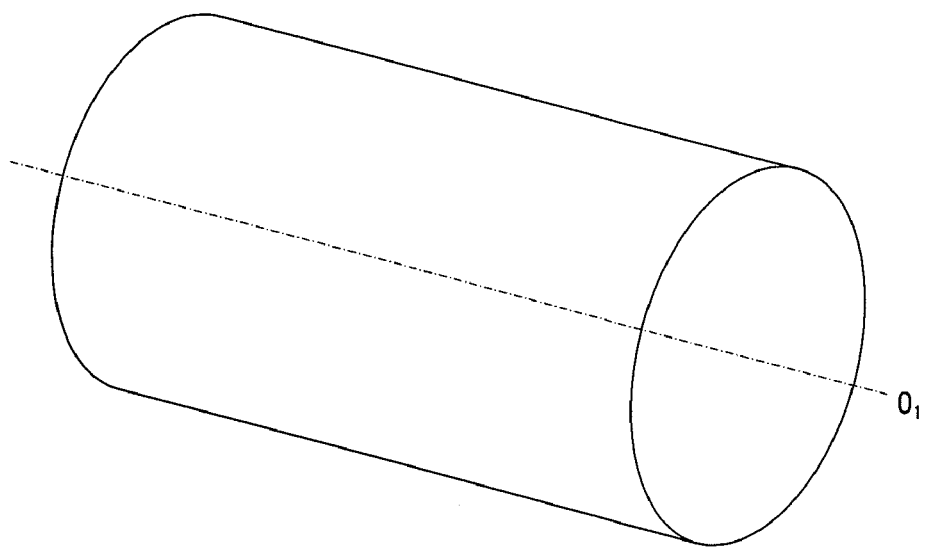
FIG. 3 is a perspective view showing the shape of the workpiece before machining (a raw material shape)

In the raw material shape data storage section 12, three-dimensional model data representing a raw material shape generated by the model data generating device 31, i.e., three-dimensional model data representing a workpiece shape before machining is stored. Alternatively, workpiece dimensions before machining are input from a not shown input device, and the input dimensions are stored as a raw material shape. In the embodiment, the shape of the workpiece W before machining is assumed to be the shape as shown in FIG. 3. Further, the reference numeral O1, similarly to the above, denotes the axis of the workpiece W.

The machining area recognizing section 13 recognizes a plurality of machining areas which are areas to be machined by comparing the workpiece shape after machining with the workpiece shape before machining on the basis of the data stored in the product shape data storage section 11 and in the raw material shape data storage section 12. The machining areas can be obtained by, for example, calculating the difference between the workpiece shape before machining and the workpiece shape after machining.

Specifically, as shown in FIG. 2, as the machining areas, machining areas E1, E2, E3, E4, E5, E6 and E7 are recognized. The machining area E1 is the outer peripheral surface (six planes) of a truncated hexagonal pyramid; the machining area E2 is a circular concave portion formed in the top surface of a truncated hexagonal pyramid; the machining area E3 is a circular hole formed in one of planes forming the outer peripheral surface of a truncated hexagonal pyramid; the machining area E4 is the outer peripheral surface (six planes) of a hexagonal prism; the machining area E5 is a circular hole formed in one of planes forming the outer peripheral surface of a hexagonal prism; the machining area E6 is the outer peripheral surface of a cylinder; and the machining area E7 is a circular hole formed in the outer peripheral surface of a cylinder.

Figure 4:
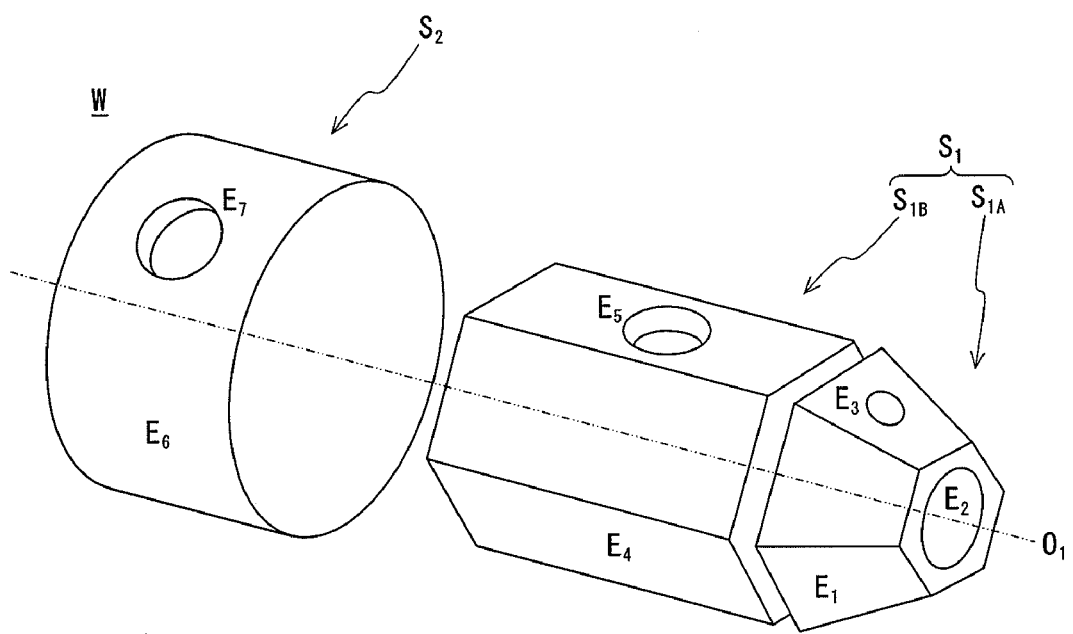
FIG. 4 is an illustration for explaining division of the workpiece.

The workpiece dividing section 14 sets, on the basis of the three-dimensional model data stored in the product shape data storage section 11 and the machining areas recognized by the machining area recognizing section 13, a plurality of structures which each include one or more of the machining areas and which are obtained by dividing the workpiece W in the direction of its axis O1. For example, as shown in FIG. 4, the workpiece W is divided largely into a structure S1 including the machining areas E1, E2, E3, E4 and E5 and a structure S2 including the machining areas E6 and E7, and the structure S1 is further divided into a structure S1A including the machining areas E1, E2 and E3 and a structure S1B including the machining areas E4 and E5.

The connection relationship recognizing section 15 recognizes a connection relationship between the machining areas on the basis of the three-dimensional model data stored in the product shape data storage section 11 and the machining areas recognized by the machining area recognizing section 13.

The connection relationship means, for example, which of the machining areas adjoin each other and which of the machining areas they exist on. In the embodiment, the connection relationship recognizing section 15 recognizes that the machining areas E1 and E4 adjoin each other, that the machining areas E4 and E7 adjoin each other, that the machining area E2 is formed in the top surface of the truncated hexagonal pyramid related to the machining area E1, that the machining area E3 is formed in the machining area E1, that the machining area E5 is formed in the machining area E4, and that the machining area E7 is formed in the machining area E6.

In the first machining information database 16, machining information such as information for determining a corresponding machining type for various machining areas and information for determining a machining order for machining various machining areas are stored. As the machining type, for example, outer-periphery cutting, inner-periphery cutting and hole machining related to turning, and outer-periphery cutting, inner-periphery cutting, surface machining, pocket machining and hole machining related to milling are given.

Figure 5:
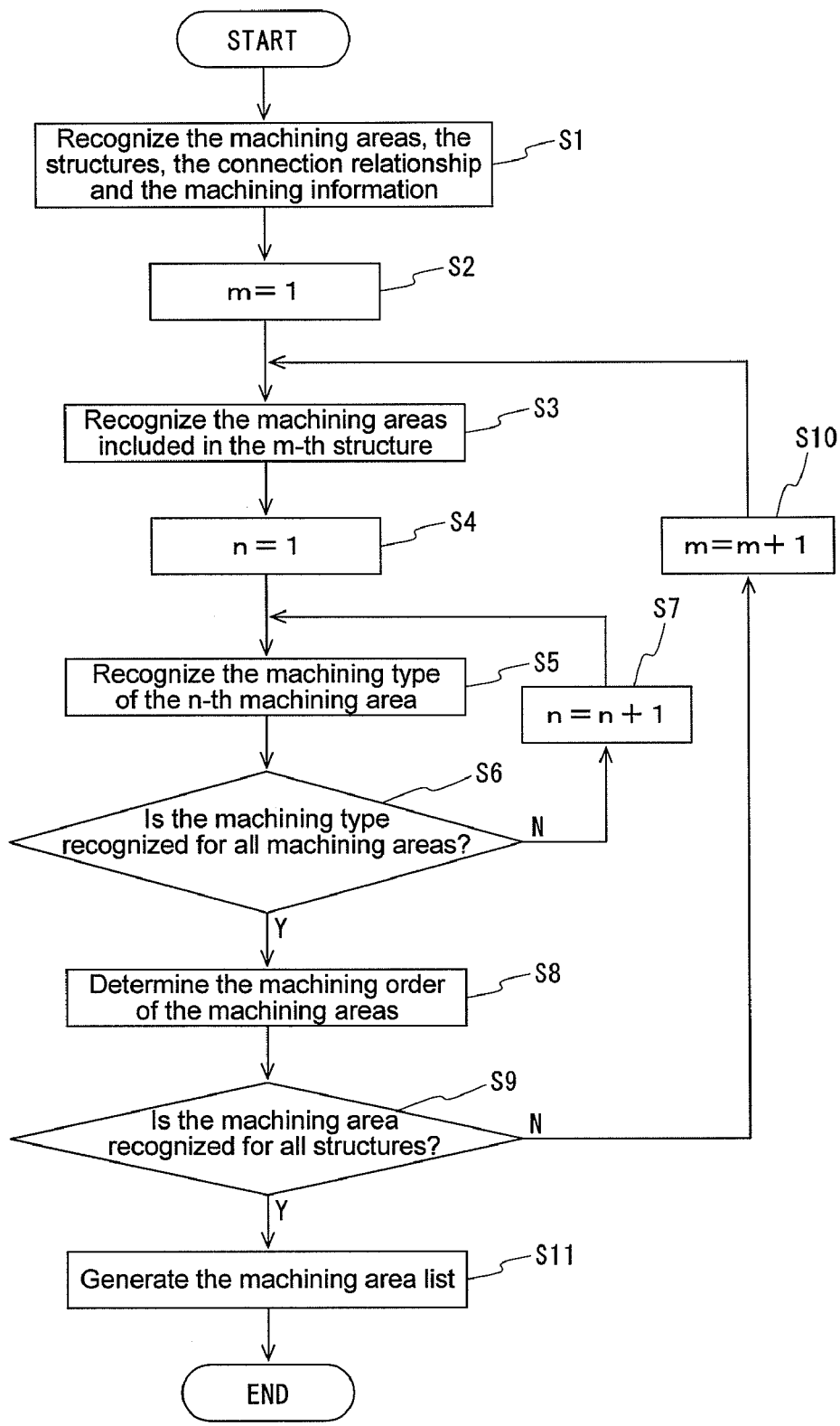
FIG. 5 is a flowchart showing a series of processings in a machining area list generating section of the embodiment.

The machining area list generating section 17 generates a machining area list by executing a series of processings as shown in FIG. 5 on the basis of the machining areas recognized by the machining area recognizing section 13, the structures set by the workpiece dividing section 14, the connection relationship recognized by the connection relationship recognizing section 15 and the machining information stored in the first machining information database 16.

That is, the machining area list generating section 17 initially recognizes the machining areas recognized by the machining area recognizing section 13, the structures set by the workpiece dividing section 14, the connection relationship recognized by the connection relationship recognizing section 15 and the machining information stored in the first machining information database 16 (step S1), and then sets a counter m to 1 (step S2) and recognizes the machining areas included in the m-th structure (step S3).

Subsequently, the machining area list generating section 17 sets a counter n to 1 (step S4), and then on the basis of the recognized machining areas, structures, and connection relationship, recognizes, for each of all of the machining areas included in the m-th structure, a machining type corresponding thereto while updating the counter n (steps S5 to S7).

For example, when a machining area is a cylindrical shape and the axis of an element (model component) representing the machining area coincides with the axis of the workpiece (spindle), outer-periphery cutting or inner-periphery cutting related to turning is recognized, and when a machining area is a hole shape and the axis of an element (model component) representing the machining area coincides with the axis of the workpiece (spindle), hole machining related to turning is recognized. On the other hand, when a machining area is one of a cylindrical shape, a hole shape and a concave shape and the axis of an element (model component) representing the machining area does not coincide with the axis of the workpiece (spindle), outer-periphery cutting, inner-periphery cutting, hole machining or pocket machining related to milling is recognized, and when a machining area is a plane shape, surface machining related to milling is recognized.

After the respective machining types of all of the machining areas included in the m-th structure are recognized, the machining area list generating section 17 determines a machining order of these machining areas on the basis of the recognized machining areas, connection relationship, machining information and machining types (step S8), and then executes the same processings for each of all of the structures while updating the counter m (steps S3 to S10).

In the embodiment, the machining areas E1, E2 and E3 are recognized as the machining areas included in the first structure S1A; the machining areas E4 and E5 are recognized as the machining areas included in the second structure S1B; and the machining areas E6 and E7 are recognized as the machining areas included in the third structure S2. Further, it is recognized that: the machining type of the machining area E1 is surface machining and milling; the machining type of the machining area E2 is inner-periphery cutting and turning; the machining type of the machining area E3 is hole machining and milling; the machining type of the machining area E4 is surface machining and milling; the machining type of the machining area E5 is hole machining and milling; and the machining type of the machining area E6 is outer-periphery cutting and turning; and the machining type of the machining area E7 is hole machining and milling. Furthermore, the machining order of the machining areas E1, E2 and E3 included in the structure S1A is determined from the connection relationship between the machining areas E1, E2 and E3 etc. so that, for example, the machining areas E1, E2 and E3 are machined in the order of the machining areas E1, E2, E3; the machining order of the machining areas E4 and E5 included in the structure S1B is determined from the connection relationship between the machining areas E4 and E5 etc. so that, for example, the machining areas E4 and E5 are machined in the order of the machining areas E4, E5; and the machining order of the machining areas E6 and E7 included in the structure S2 is determined from the connection relationship between the machining areas E6 and E7 etc. so that, for example, the machining areas E6 and E7 are machined in the order of the machining areas E6, E7.

Thereafter, a machining area list is generated on the basis of the recognized machining areas, structures, connection relationship and machining types and the determined machining orders (step S11). This machining area list is, for example, as shown in FIG. 6, configured as a data structure represented by a tree structure where: the workpiece is a root node; the workpiece and the structures S1 and S2 have such a parent-child relationship that the workpiece is a parent and the structures S1 and S2 are its children; the structures S1 and S2 have a sibling relationship; the structure S1 and the structures S1A and S1B have such a parent-child relationship that the structure S1 is a parent and the structures S1A and S1B are its children; the structures S1A and S1B have a sibling relationship; the structure S1A and the machining areas E1, E2 and E3 have such a parent-child relationship that the structure S1A is a parent and the machining areas E1, E2 and E3 are its children; the machining areas E1, E2 and E3 have a sibling relationship; the structure S1B and the machining areas E4 and E5 have such a parent-child relationship that the structure S1B is a parent and the machining areas E4 and E5 are its children; the machining areas E4 and E5 have a sibling relationship; the structure S2 and the machining areas E6 and E7 have such a parent-child relationship that the structure S2 is a parent and the machining areas E6 and E7 are its children; and the machining areas E6 and E7 have a sibling relationship.

Figure 6:
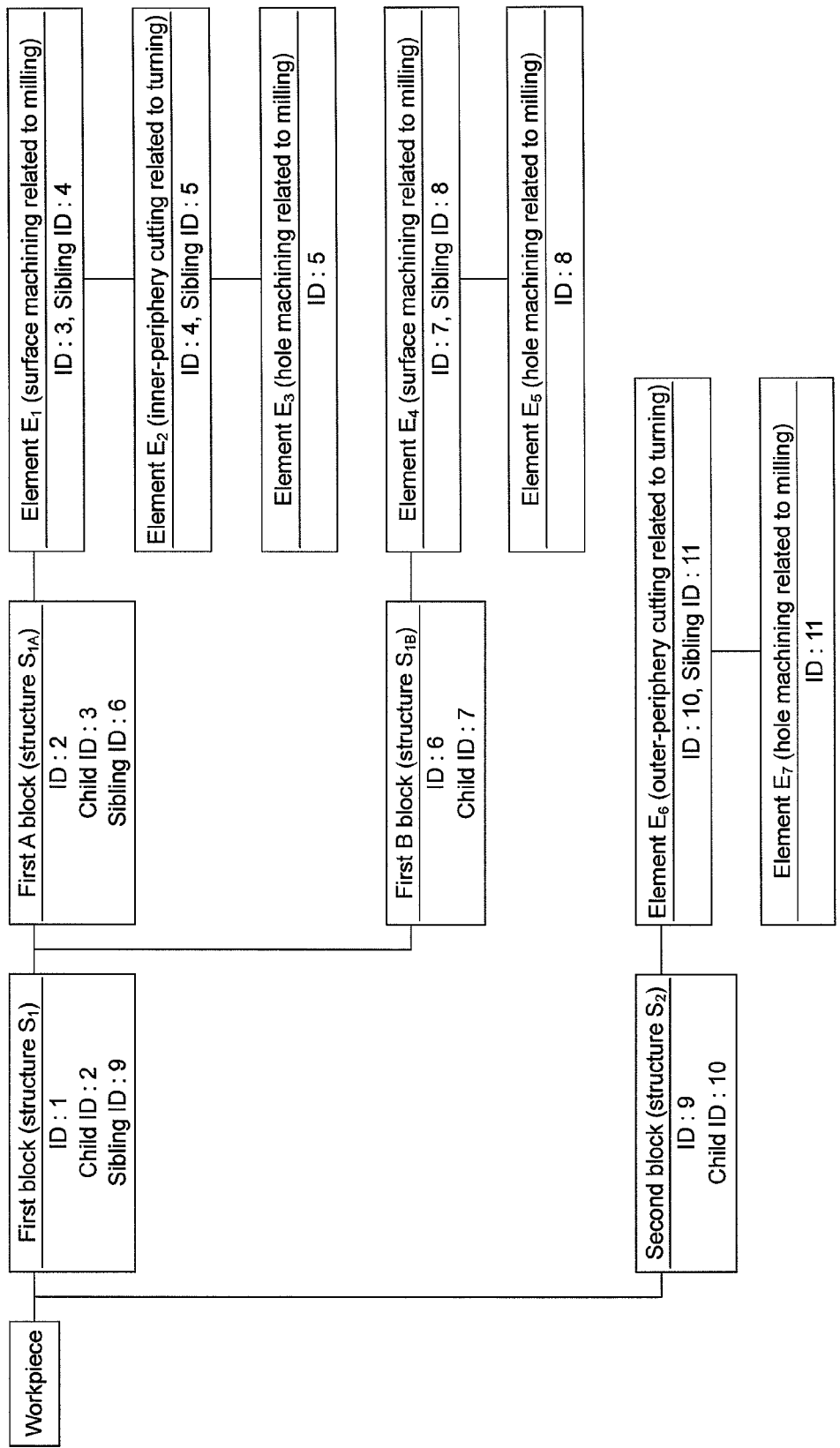
FIG. 6 is an illustration showing a data structure of a machining area list generated by the machining area list generating section of the embodiment.

In FIG. 6, the structures S1, S2, S1A and S1B are represented as a first block, a second block, a first A block and a first B block, respectively. Additionally, the machining areas E1, E2, E3, E4, E5, E6 and E7 are represented as elements E1, E2, E3, E4, E5, E6 and E7, respectively. Further, in each of the blocks S1, S1A, S1B and S2 and each of the elements E1, E2, E3, E4, E5, E6 and E7, an ID number, a child ID number, a sibling ID number etc. are set, and thereby the blocks S1, S1A, S1B and S2 and the elements E1, E2, E3, E4, E5, E6 and E7 are correlated with one another. Furthermore, the ID numbers are assigned to the elements E1, E2, E3, E4, E5, E6 and E7 so that the elements E1, E2 and E3, the elements E4 and E5, and the elements E6 and E7 are machined in the respective determined machining orders.

The coordinate system setting section 18 recognizes the machining areas and their corresponding machining types on the basis of the machining areas recognized by the machining area recognizing section 13 and the machining area list generated by the machining area list generating section 17, and sets, for each of the machining areas, a coordinate system corresponding thereto.

For example, as shown in FIG. 2, with respect to the machining areas E1 and E4 related to surface machining and milling, a Z1 axis and a Z4 axis are set perpendicular to one of the planes of the element representing the machining area E1 and one of the planes of the element representing the machining area E4, respectively. Although not shown in the drawings, such a Z1 axis is set for each of the six planes of the truncated hexagonal pyramid and such a Z4 is set for each of the six planes of the hexagonal prism. With respect to the machining areas E3, E5 and E7 related to hole machining and milling, a Z3 axis, a Z5 axis and a Z7 axis are set parallel to the axis of the hole of the element representing the machining area E3, the axis of the hole of the element representing the machining area E5, and the axis of the hole of the element representing the machining area E7, respectively. These Z1, Z3, Z4, Z5 and Z7 axes are one of three orthogonal axes of the respective coordinate systems, and are each set to become parallel to the axis of a rotary tool held by the first tool rest. With respect to the machining area E2 related to inner-periphery cutting and turning and the machining area E6 related to outer-periphery cutting and turning, a new coordinate system is not set because the axes of the elements representing them each coincide with the axis O1 of the workpiece W. Accordingly, a coordinate system is set for such a machining area that the axis of an element representing it does not coincide with the axis O1 of the workpiece W.

In the second machining information database 19, machining information for setting a machining process corresponding to a machining type is stored. This machining information includes, for example, information on tools, machining conditions and the NC lathe (for example, the axis configuration etc.).

The machining process setting section 20 sets, for each of the machining areas, a machining process corresponding to the machining type thereof on the basis of the machining area list generated by the machining area list generating section 17, the coordinate systems set by the coordinate system setting section 18 and the machining information stored in the second machining information database 19.

Specifically, the machining types of the machining areas E1, E2, E3, E4, E5, E6 and E7 in the machining area list are referred to and machining processes corresponding thereto are set, and, on the basis of the set machining processes, a series of machining processes from the start to end of the machining of the workpiece is set. At this time, the machining order of the machining areas E1, E2, E3, E4, E5, E6 and E7 included in the structures S1A, S1B and S2 is the order of the ID numbers. That is, machining processes are set so that: the machining order of the machining areas E1, E2 and E3 included in the structure S1A is the order of the machining areas E1, E2, E3; the machining order of the machining areas E4 and E5 included in the structure S1B is the order of the machining areas E4, E5; and the machining order of the machining areas E6 and E7 included in the structure S2 is the order of the machining areas E6, E7.

Further, the machining processes are set so that, with respect to the machining areas E1 and E4 related to milling and surface machining which form the outer peripheral surfaces of the structures S1A and S1B, respectively, the machining areas E1 and E4 are each machined by milling after being machined by turning into the respective turning shapes which respectively include the machining areas E1 and E4 to be machined by milling. That is, when machining the machining areas E1, E2, E3, E4 and E5 included in the structure S1, rough cutting is initially performed on portions corresponding to the machining areas E1 and E4.

The turning shape means a shape which is obtained by rotating, about the axis of the workpiece W (structure S1A or S1B), the most distant point, within the machining area E1 or E4 to be machined by milling, from the center of the workpiece W (structure S1A or S1B) in a plane vertical to the axis of the workpiece W (structure S1A or S1B), and in which the workpiece W is not machined into the shape to be obtained after milling. In the embodiment, since the sectional shapes of the structures S1A and S1B are each a hexagon, the turning shapes thereof are obtained by rotating, for example, their respective apexes about the axis of the workpiece W. That is, the portion corresponding to the machining area E1 is machined by turning into a truncated cone shape, and the portion corresponding to the machining area E4 is machined by turning into a cylindrical shape.

The machining order determining section 21 finally determines an execution order of the machining processes on the basis of the machining processes set by the machining process setting section 20. Specifically, an execution order of the machining processes is finally determined in consideration for the coordinate systems set for the machining areas E1, E2, E3, E4, E5, E6 and E7. and the machining types of the machining areas E1, E2, E3, E4, E5, E6 and E7.

Figure 7:
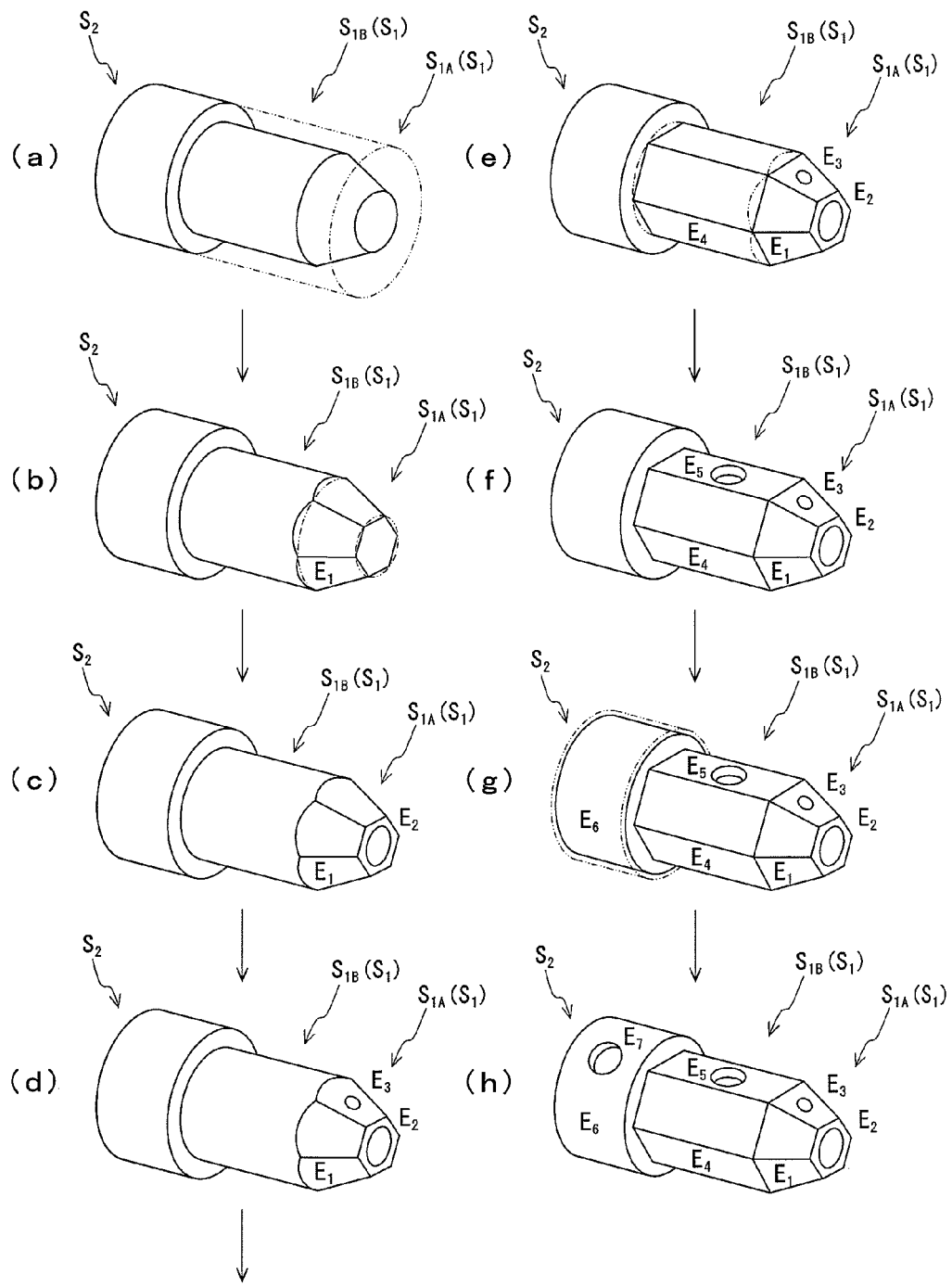
FIG. 7 is an illustration showing a series of machining processes for machining the workpiece in the embodiment.

In the embodiment, for example, an execution order of the machining processes is determined so that the machining areas E1, E2, E3, E4, E5, E6 and E7 are machined in turn. That is, an execution order of the machining processes is determined so that rough cutting is initially performed on the portions corresponding to the machining areas E1 and E4 as shown in FIG. 7(a), subsequently the machining areas E1, E2 and E3 are machined in turn as shown in FIGS. 7(b) to 7(d), thereafter the machining areas E4 and E5 are machined in turn as shown in FIGS. 7(e) and 7(f), and then the machining areas E6 and E7 are machined in turn as shown in FIGS. 7(g) and 7(h).

The NC program generating section 22 generates an NC program on the basis of the machining processes set by the machining process setting section 20 and the machining order finally determined by the machining order determining section 21, and the generated NC program is stored in the NC program storage section 23. The NC program stored in the NC program storage section 23 is output by an output device 32.

According to the programming apparatus 1 of the embodiment configured as described above, three-dimensional model data representing a workpiece shape after machining is stored in the product shape data storage section 11, three-dimensional model data representing a workpiece shape before machining is stored in the raw material shape data storage section 12, and machining information are stored in the first machining information database 16 and in the second machining information database 19.

On the basis of the three-dimensional model data stored in the product shape data storage section 11 and in the raw material shape data storage section 12, a plurality of machining areas E1, E2, E3, E4, E5, E6 and E7 are recognized by the machining area recognizing section 13. On the basis of the three-dimensional model data stored in the product shape data storage section 11 and the machining areas E1, E2, E3, E4, E5, E6 and E7 recognized by the machining area recognizing section 13, a plurality of structures S1A, S1B and S2 are set by the workpiece dividing section 14. On the basis of the three-dimensional model data stored in the product shape data storage section 11 and the machining areas E1, E2, E3, E4, E5, E6 and E7 recognized by the machining area recognizing section 13, a connection relationship between the machining areas E1, E2, E3, E4, E5, E6 and E7 is recognized by the connection relationship recognizing section 15.

Thereafter, on the basis of the machining areas E1, E2, E3, E4, E5, E6 and E7 recognized by the machining area recognizing section 13, the structures S1A, S1B and S2 set by the workpiece dividing section 14, the connection relationship recognized by the connection relationship recognizing section 15 and the machining information stored in the first machining information database 16, a machining area list represented by a tree structure in which the structures S1A, S1B and S2, the machining areas E1, E2, E3, E4, E5, E6 and E7, machining types of the machining areas E1, E2, E3, E4, E5, E6 and E7 and the connection relationship between the machining areas E1, E2, E3, E4, E5, E6 and E7 are correlated with one another is generated by the machining area list generating section 17.

Subsequently, on the basis of the machining areas E1, E2, E3, E4, E5, E6 and E7 recognized by the machining area recognizing section 13 and the machining area list generated by the machining area list generating section 17, a coordinate system is set by the coordinate system setting section 18 for each of the machining areas E1, E3, E4, E5 and E7. On the basis of the machining area list generated by the machining area list generating section 17, the coordinate systems set by the coordinate system setting section 18 and the machining information stored in the second machining information database 19, machining processes are set by the machining process setting section 20. On the basis of the machining processes set by the machining process setting section 20, an execution order of the machining processes is finally determined by the machining order determining section 21.

Then an NC program is generated by the NC program generating section 22 on the basis of the machining processes set by the machining process setting section 20 and the machining order finally determined by the machining order determining section 21, and the generated NC program is stored in the NC program storage section 23.

Thus, according to the programming apparatus 1 of the present embodiment, on the basis of three-dimensional model data of a workpiece W to be turned and milled, such a machining area list that all machining areas of the workpiece W are gathered is generated, and machining processes based on the generated machining area list are set and an NC program is generated on the basis thereof. Therefore, it is possible to, without bothering the operator, easily and efficiently generate an NC program for machining a workpiece W to be both turned and milled.

Thus, one embodiment of the present invention has been described. However, a mode in which the present invention can be realized is not limited thereto.

In the above embodiment, although the structure S1 set by the workpiece dividing section 14 is further divided into the structures S1A and S1B, the structure S1 is not necessarily further divided. In this case, the machining area list generating section 17 recognizes the machining areas E1, E2, E3, E4 and E5 and the machining areas E6 and E7 as the machining areas included in the first structure S1 and the machining areas included in the second structure S2, respectively. Further, the machining order of the machining areas E1, E2, E3, E4 and E5 included in the structure S1 is determined from the connection relationship between the machining areas E1, E2, E3, E4 and E5 etc. so that, for example, the machining areas E1, E2, E3, E4 and E5 are machined in the order of the machining areas E1, E2, E3, E4, E5. The machining order of the machining areas E6 and E7 included in the structure S2 is, similarly to the above, determined so that the machining areas E6 and E7 are machined in the order of the machining areas E6, E7.

Figure 8:
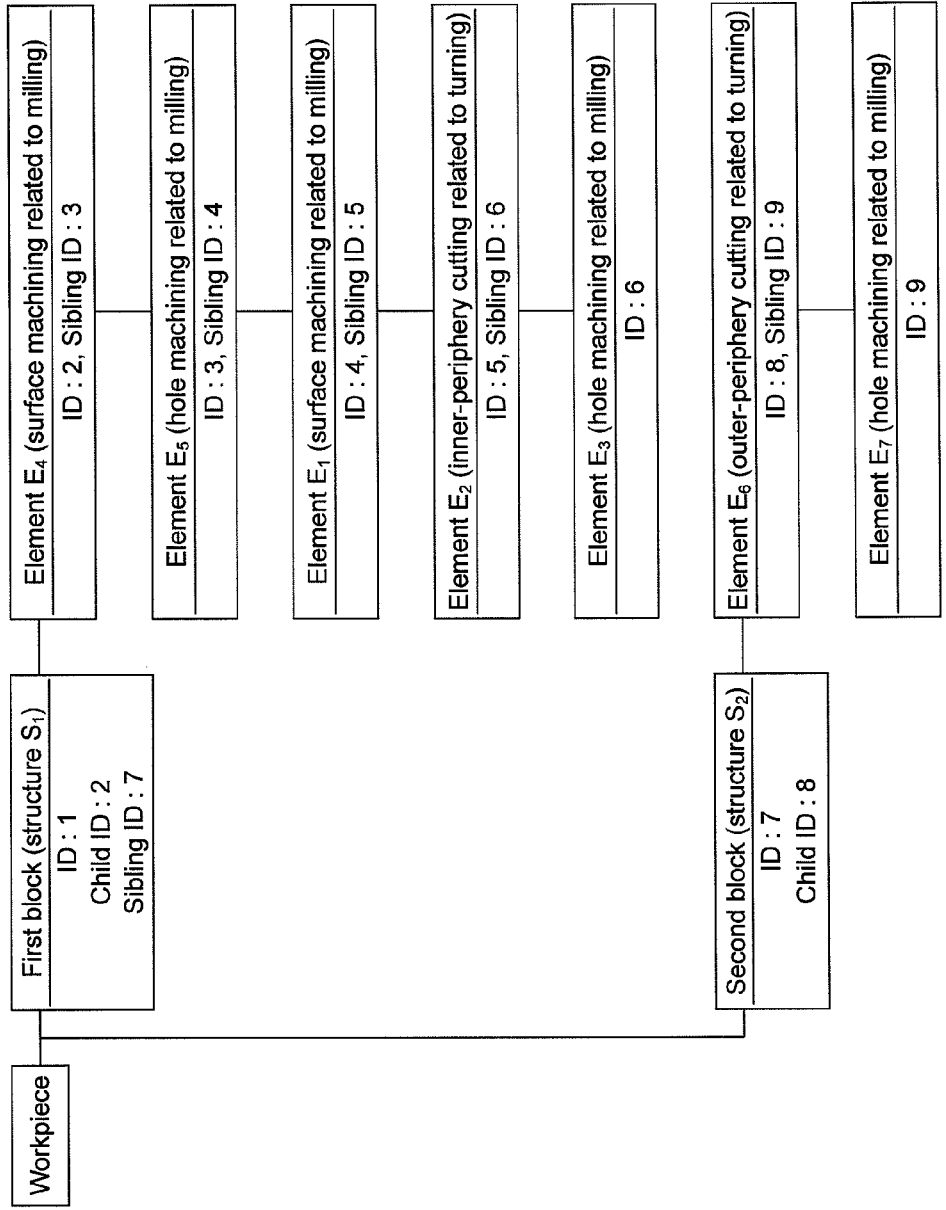
FIG. 8 is an illustration showing a data structure of the machining area list according to an alternative embodiment of the present invention.

Further, the generated machining area list is configured as a data structure represented by a tree structure in which: for example, as shown in FIG. 8, the workpiece is a root node; the workpiece and the structures S1 and S2 have such a parent-child relationship that the workpiece is a parent and the structures S1 and S2 are its children; the structures S1 and S2 have a sibling relationship; the structure S1 and the machining areas E1, E2, E3, E4 and E5 have such a parent-child relationship that the structure S1 is a parent and the machining areas E1, E2, E3, E4 and E5 are its children; the machining areas E1, E2, E3, E4 and E5 have a sibling relationship; the structure S2 and the machining areas E6 and E7 have such a parent-child relationship that the structure S2 is a parent and the machining areas E6 and E7 are its children; and the machining areas E6 and E7 have a sibling relationship. The ID numbers are assigned to the elements E1, E2, E3, E4, E5, E6 and E7, so that the elements E1, E2, E3, E4 and E5 and the elements E6 and E7 are machined in the respective determined machining orders.

Furthermore, the machining process setting section 20 sets machining processes so that the machining order of the machining areas E1, E2, E3, E4 and E5 included in the structure S1 is the order of the machining areas E1, E2, E3, E4, E5 and the machining order of the machining areas E6 and E7 included in the structure S2 is the order of the machining areas E6, E7. Further, the machining processes are set so that, with respect to the machining areas E1 and E4 related to milling and surface machining which form the outer peripheral surface of the structure S1, rough cutting is performed so that portions corresponding to the machining areas E1 and E4 become each a cylindrical shape.

Figure 9:
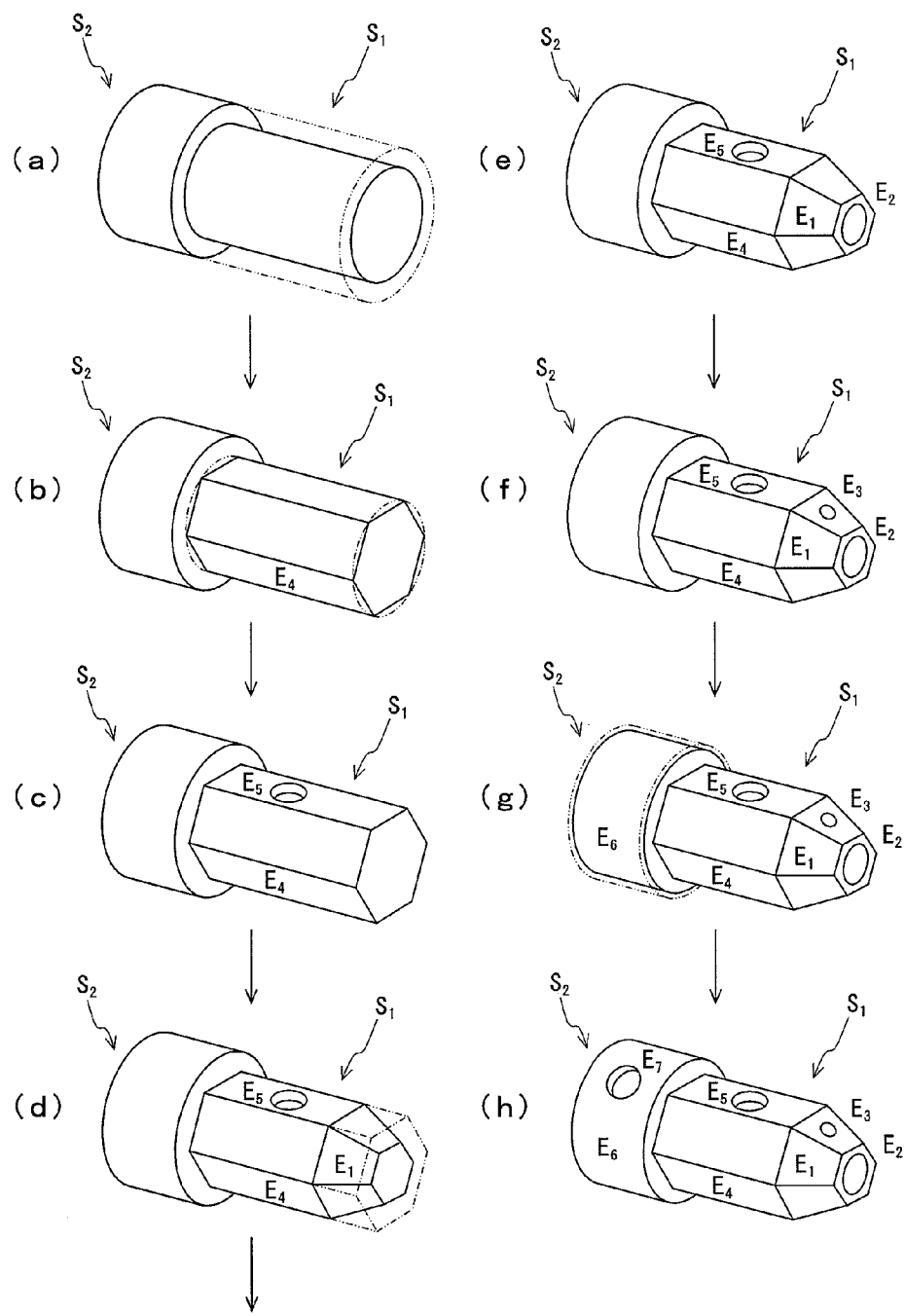
FIG. 9 is an illustration showing a series of machining processes for machining the workpiece in the alternative embodiment of the present embodiment.

Additionally, the machining order determining section 21 determines a machining order in which the portions corresponding to the machining areas E1 and E4 are initially machined as shown in FIG. 9(a), subsequently the machining areas E4 and E5 are machined in turn as shown in FIGS. 9(b) and 9(c), thereafter the machining areas E1, E2 and E3 are machined in turn as shown in FIGS. 9(d) to 9(f), and then the machining areas E6 and E7 are machined in turn as shown in FIGS. 9(g) and 9(h).

Additionally, for example, in a case where a workpiece W is divided into two structures, and a machining area forming the outer peripheral surface of one of the structures is a cylindrical surface whose axis coincides with the axes of the spindles and a machining area forming the outer peripheral surface of the other of the structures is a cylindrical surface whose axis does not coincide with the axes of the spindles, the machining process setting section 20 is configured to set, with respect to the machining area related to the cylindrical surface whose axis does not coincide with the axes of the spindles, such a machining process that, after the machining area related to the cylindrical surface whose axis coincides with the axes of the spindles is machined by turning, the workpiece W is re-held by the spindles so that the axis of the machining area related to the cylindrical surface whose axis does not coincide with the axes of the spindles coincides with the axes of the spindles, and then the machining area is machined by turning.

Reference Signs List
1 Programming apparatus
11 Product shape data storage section
12 Raw material shape data storage section
13 Machining area recognizing section
14 Workpiece dividing section
15 Connection relationship recognizing section
17 Machining area list generating section
18 Coordinate system setting section
20 Machining process setting section
21 Machining order determining section
22 NC program generating section
23 NC program storage section
Citation List
Patent Literature
Japanese Unexamined Patent Application Publication No. 2008-87147

What is claimed is:
1. A programming apparatus for generating an NC program for turning and milling a workpiece, comprising:
  a model data storage section for storing three-dimensional model data representing the shape of a workpiece after machining;
  a machining area recognizing section for recognizing, on the basis of the three-dimensional model data of the workpiece stored in the model data storage section, a plurality of machining areas which are areas to be machined;
  a workpiece dividing section for setting, on the basis of the three-dimensional model data of the workpiece stored in the model data storage section and the machining areas recognized by the machining area recognizing section, a plurality of structures which each include one or more of the machining areas and which are obtained by dividing the workpiece in its axial direction;
  a connection relationship recognizing section for recognizing a connection relationship between the machining areas on the basis of the three-dimensional model data of the workpiece stored in the model data storage section and the machining areas recognized by the machining area recognizing section;
  a machining area list generating section for, on the basis of the machining areas recognized by the machining area recognizing section, the structures set by the workpiece dividing section, and the connection relationship recognized by the connection relationship recognizing section, recognizing, for each of the machining areas included in the structures, either a machining type related to turning or a machining type related to milling which corresponds thereto, and generating a machining area list in which the structures, the machining areas, the machining types and the connection relationship are correlated with one another;

a machining process setting section for setting, for each of the machining areas, a machining process which corresponds to the machining type related to turning or machining type related to milling thereof on the basis of the machining area list generated by the machining area list generating section;

an NC program generating section for generating an NC program on the basis of the machining processes set by the machining process setting section; and an NC program storage section for storing the NC program generated by the NC program generating section.

2. The programming apparatus as set forth in claim 1, wherein the machining area list generated by the machining area list generating section is configured as a data structure in which at least the relationship between the structures and the machining areas included therein and the relationship between the machining areas are represented by a tree structure where the structures have a sibling relationship and the structures and the machining areas included therein have such a parent-child relationship that each of the structures is a parent and the machining areas included therein are its children.

3. The programming apparatus as set forth in claim 1, wherein the machining process setting section is configured to, in setting machining processes corresponding to the machining types related to milling of the machining areas, with respect to a machining area related to a plane forming the outer peripheral surface of one of the structures, set such a machining process that the machining area is machined by milling after being machined by turning into a turning shape including the machining area to be machined by milling.

4. The programming apparatus as set forth in claim 1, wherein the programming apparatus further comprises a coordinate system setting section for setting, for each of the machining areas, a coordinate system corresponding thereto on the basis of the machining areas recognized by the machining area recognizing section and the machining area list generated by the machining area list generating section, and the machining process setting section is configured to set, for each of the machining areas, a machining process corresponding to the machining type related to turning or machining type related to milling thereof on the basis of the machining area list generated by the machining area list generating section and the coordinate systems set by the coordinate system setting section.

5. The programming apparatus as set forth in claim 1, wherein the programming apparatus further comprises a machining order determining section for finally determining an execution order of the machining processes on the basis of the machining process set by the machining process setting section, and the NC program generating section is configured to generate an NC program on the basis of the machining processes set by the machining process setting section and the machining order finally determined by the machining order determining section.

* * * * *